June 13, 1933. J. M. WHELTON 1,913,421
TRIMMING MACHINE
Filed May 12, 1930
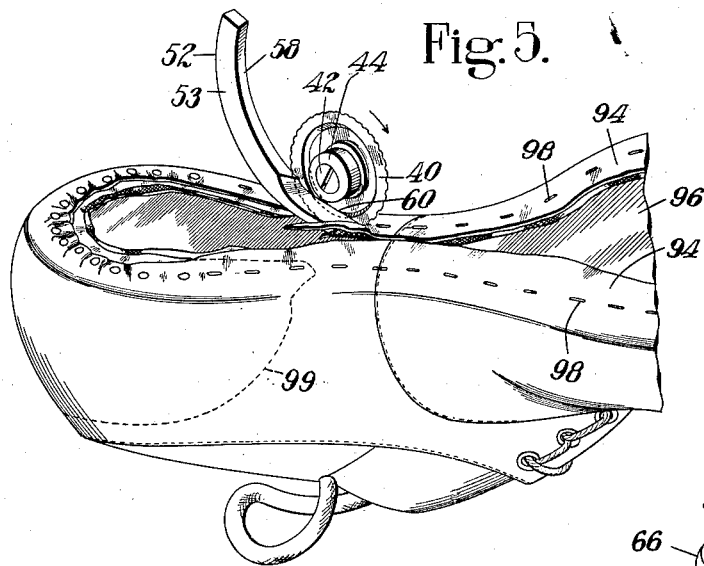
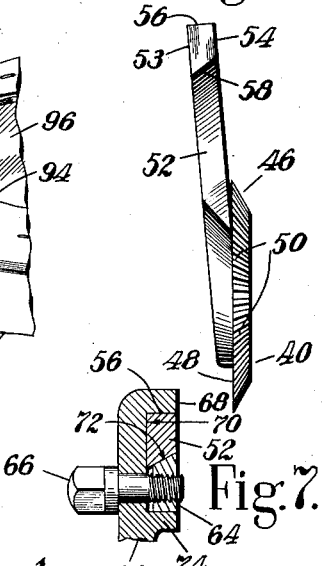
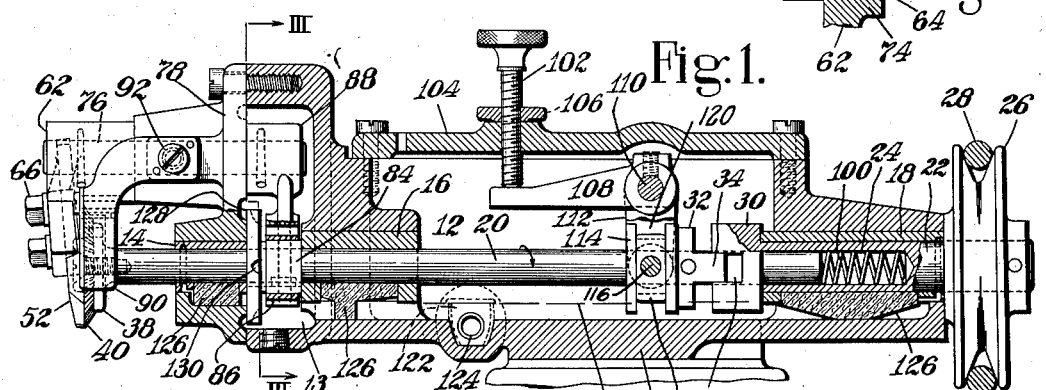
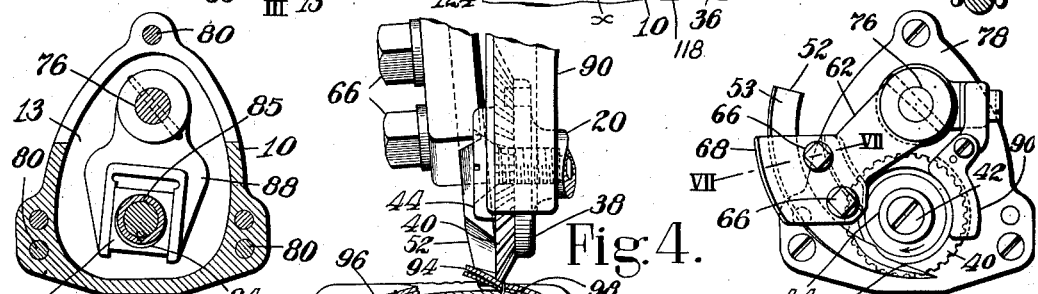
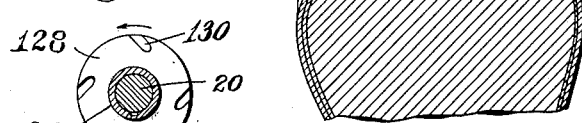
INVENTOR
John M. Whelton
By his Attorney,
Nelson W. Howard Patented June 13, 1933

1,913,421

UNITED STATES PATENT OFFICE

JOHN M. WHELTON, OF PEABODY, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Application filed May 12, 1930. Serial No. 451,694.

This invention relates to trimming machines and is herein illustrated as embodied in a machine designed to operate on lasted shoes to trim overdrawn margins of upper material that lie in confronting relation to the insoles and are secured thereto so that surplus portions of said margins may be severed, although the invention is not limited to machines for operating on shoes.

In shoes of certain types, the margins referred to extend inwardly beyond the holding means by which they are fastened to the insoles, the portions inside the lines of fastening being mostly surplusage after completion of the lasting operation. It is therefore common practice to sever the margins inside but adjacent to the lines of fastening, leaving only sufficient material inside these lines to maintain the necessary strength of the connection with the fastening means.

In a shoe in which the overdrawn margins of upper material lie in confronting relation to the insole as above set forth, the margins normally lie substantially in contact with the insole. Consequently, to sever the margins without cutting into the insole, it is necessary to separate them slightly from the insole at the locality where the severing is being done.

With regard to trimming under conditions of the character above set forth an object of the present invention is to provide an improved trimming machine that will not only separate the margin to be trimmed from some other element of the work with which it normally lies in contact, but will also reduce the width of the margin with a continuous shearing cut, to the end that the trimmed edge will be even and regular, with regard particularly to sharp curves, as at the toe ends of lasted shoes.

Another object is to provide a machine that will feed the work, to the end that operators may do large quantities of work without being unduly fatigued by manipulating the work-pieces.

Accordingly, a feature of the invention consists in a trimming machine comprising a blade formed and arranged to run between two confronting and contiguous elements of a work-piece, for example, the insole and the overdrawn margin of the upper of a lasted shoe, the blade having a shearing edge arranged to lift one of said elements from the other, and a rotary driven cutter arranged to operate in shearing relation to the shearing edge adjacent to the leading end of the blade. Preferably, to insure a considerable feeding effect by the rotary cutter, the cutting edge thereof is provided with many small notches by which it is divided into teeth.

In the illustrated machine the blade above referred to is reciprocated approximately lengthwise of its cutting edge to separate the two confronting elements of the work-piece without requiring effort on the part of the operator for that purpose. This reciprocatory motion is rapid but of very small amplitude, preferably no more than one-eighth of an inch. For the purpose of trimming lasted shoes of the type referred to, satisfactory results may be obtained by using an oscillatory blade of arcuate form, in which case the rotary cutter will preferably be arranged to cooperate with the inner edge of the blade, that edge being the shearing edge.

The foregoing and other features of the invention are hereinafter described and claimed, and are illustrated in the accompanying drawing.

Referring to the drawing,

Fig. 1 is a vertical section through a machine embodying the features hereinbefore set forth and others hereinafter described, the front of the machine being at the left of the figure;

Fig. 2 is a front elevation of the assembled trimming elements of the machine;

Fig. 3 is a sectional view through the structure intersected by the line III—III of Fig. 1 and shows the mechanism for operating the reciprocatory shearing member;

Fig. 4 is an elevation of the shearing members in the act of severing a margin of upper material of a lasted shoe, the direction of view being the same as that of Fig. 1;

Fig. 5 is a perspective view of a lasted shoe and of the shearing members in the act of severing one of the margins of upper material that lie on the insole;

Fig. 6 is a top plan view of the two shearing members in cooperative relation;

Fig. 7 is a section through the clamping means by which the reciprocatory shearing member is held (see line VII—VII of Fig. 2); and Fig. 8 is a face view of an oil-distributing disk shown at the left of line III—III of Fig. 1.

The frame 10 of the machine is preferably hollow to provide connecting chambers 12 and 13 for holding a body of lubricating oil. The frame is also provided with a front bearing 14, an intermediate bearing 16 and a rear bearing 18 all in coaxial relation. A horizontal cutter-shaft 20 is mounted in the bearings 14 and 16, while a power shaft 22 is mounted in the rear bearing 18. The rear end of the shaft 20 projects into a bore 24 in the shaft 22, the shafts being operatively connected by a coupling that provides for longitudinal adjustment of the shaft 20. A pulley 26 affixed to the shaft 22 receives rotation from a driving belt 28. The forward end of the driving shaft 22 projects into the oil-chamber 12 and is provided with a head 30 which constitutes one element of the aforesaid coupling. The complemental element of the coupling is a collar 32 affixed to the shaft 20. The coupling elements are formed with cooperative tongue-and-groove formations 34 and 36 which transmit rotation positively from one shaft to the other but which are capable of relative axial movement.

The forward end of the cutter-shaft 20 is provided with a flange or head 38 against which a rotary, circular shearing member 40 is clamped by an attaching screw 42 and a washer 44. The rear side of the member 40 is beveled (see Fig. 6) to provide a frusto-conical surface 46, while the front face 48 of this member is slightly dished to insure a true shearing cut. The acute cutting edge formed at the intersection of the surfaces 46 and 48 is preferably divided into many small teeth to insure automatic feeding of the work, the teeth being preferably formed as a result of providing grooves 50 in the frusto-conical surface 46. The teeth, being similar to the teeth of a beveled gear, have considerable length on the rear face 46 of the shearing member, and in addition to exercising a feeding effect at the point of cut they bear against and have a supplemental feeding effect on the trimmed edge of the material that has passed the cutting point.

The complemental shearing member, as herein shown, embodies a shape and executes a motion like those of a sickle. Specifically, it consists of an arcuate blade 52, the shank portion of which has a flat front face 53, a flat rear face 54, a cylindrical outer surface 56, and a beveled inner surface 58. The shearing portion of the blade 52 is thin and narrow, being reduced to slender proportions by grinding one end thereof to a point as shown in Fig. 2, the inner face 58 being ground away for this purpose and a shearing edge 60 being thereby formed on the inner side of the arc of the blade, where, considering its location, it corresponds to the cutting edge of a sickle. The shearing portion, being wedge-shaped and pointed, is adapted to run between and separate two confronting elements of an article of work by lifting the one that runs on the cutting edge 60.

The shank portion of the blade 52 is adjustably clamped to an arm or carrier 62 by a block 64 and bolts 66 as shown in Fig. 7. The arm 62 is provided with a segmental flange 68 against which the outer curved face 56 of the blade is seated, and is also provided with a flat face 70 against which the front face 53 of the blade is seated. The block 64 is provided with a curved beveled face 72 which is a counterpart of the beveled face 58 of the blade. The opposite face of the block is seated against a shoulder 74 formed on the arm 62. The bolts 66 extend loosely through the arm 62 and engage screw-threads tapped in the block 64 so that when the bolts are set up tightly the beveled face 72 of the block clamps the blade against the flat face 70 and at the same time exerts a wedging effect by which the outer curved face 56 of the blade is clamped against the flange 68. As the shearing portion of the blade 52 is worn away by repeated sharpening operations the blade grows shorter, but the described clamping means provides for advancing the blade relatively to the arm 62 to compensate for reductions in length. To avoid unnecessary area of contact between the two shearing members the arm 62 is formed to maintain the blade 52 skewed slightly from strictly parallel relation to a plane at right-angles to the axes of the shafts, as illustrated in Figs. 4 and 6, but the rear face of the shearing portion of the blade 52 is ground in a flat plane that counteracts the skewed relation above mentioned.

The shearing portion of the blade 52 is arranged in front of the lower portion of the circular shearing member 40, the bottom of the back edge or outcurved surface of the blade being as low as, if not slightly below, the lowest portion of the member 40 to prevent the latter from roughing the element of work on which the bottom of the blade runs. The point of the blade projects slightly beyond the cutting edge of the member 40 as shown in Fig. 2, but the extent of such projection is only enough to provide a notch or opening between the two cutting edges to receive the material to be severed. Consequently, the point or leading end of the blade 52 is so near the intersection of the shearing edges that it does not stab the upper of a shoe or otherwise obstruct feeding the shoe while the latter is being turned for curvilinear trimming, as at the toe-end thereof.

The blade-supporting arm 62 is affixed to a rock-shaft 76, the axis of which is parallel to the axis of the cutter-shaft 20 and above the point of intersection of the cutting edges. The rock-shaft is journaled in a detachable cover plate 78 which forms a part of the frame structure. This cover plate is affixed to the front of the frame 10 by screws 80, and forms one wall of the chamber 13 in which the mechanism for oscillating the rock-shaft 76 is enclosed. The motion for operating the rock-shaft 76 is derived from an eccentric 84 formed on a sleeve 85 which is splined on the shaft 20 (see Fig. 3). The eccentric carries a square block 86 which is straddled and engaged by a forked arm 88 pinned to the inner end of the rock-shaft. Thus, the cutting portion of the blade 52 is reciprocated in substantially horizontal lines by the shaft that carries the rotary shear member 40. A stationary guard 90 affixed to the cover plate 78 by a screw 92 is arranged to enclose the exposed segment of the rotary shear member at the feeding-in side of the latter except the portion adjacent to the cutting point.

Figs. 4 and 5 illustrate a typical example of a lasted shoe in which the overdrawn marginal portions 94 of the upper lie on the insole 96 in confronting relation thereto and are secured to the insole by rows of staples 98. A counter-stiffener 99 lies between the upper and the lining. In the manufacture of such shoes the uppers are commonly cut to provide ample material by which the grippers of a lasting machine may obtain a firm hold and also to insure sufficient width in the margins 94 to afford strong connection with the staples 98 or other fasteners, as the case may be. Consequently, after the shoe has been lasted the quantity of overdrawn upper material lying inside the rows of staples 98 is nearly always more than enough to insure the required strength of connection afforded by the staples, and it is desirable to sever the margins 94 adjacent to the staples to make the bottom of the shoe as nearly smooth and even as possible for the outsole that will subsequently be attached. The machine illustrated herein is designed with a view to performing the trimming operation above described.

Assuming that the machine is being driven, the rotary shear member 40 will rotate in the direction indicated by arrows in Figs. 2 and 5, and the cutting portion of the blade 52 will be vibrated in substantially horizontal lines with strokes about $\frac{1}{16}$ of an inch in length. The operator presents a shoe to the shear members as shown in Fig. 5, the severing cut starting approximately at a point where the heel-seat portion and a shank portion of the shoe merge one into the other. The operator raises the shoe until the insole abuts against the bottom surface of the cutting portion of the blade 52 and then moves the shoe from right to left. The point of the blade 52 finds entrance between the insole and the overdrawn margin 94 and raises the margin slightly from the insole. The raised margin thus runs on the cutting edge 60 of the blade 52 and is immediately engaged from above by the toothed cutting edge of the rotary shear member 40. As soon as the margin 94 is once penetrated by a tooth of the rotary shear member, the latter exercises a continuous feeding action by which the margin 94 is thereafter drawn toward the shearing point, the cutting portion of the blade 52 meanwhile running between the insole and the margin 94 and progressively raising the margin by successive wedging motions counter to the direction of feed. Once the shearing cut is begun, the operator has merely to guide the shoe along the desired course, the rotary cutter furnishing the necessary feeding action while the oscillatory cutter separates the margin 94 from the insole.

The illustrated machine is also provided with means for maintaining pressure of the rotary cutter 40 against the oscillatory cutter 52 and with improved means for regulating such pressure. For this purpose a spring 100 is compressed in the bore 24 of the driving shaft 22 and abuts against the rear end of the cutter-shaft 20. Preferably, the initial applied force of the spring 100 is more than enough to maintain contact of the rotary cutter against the oscillatory cutter even when seams or other relatively thick or tough substances arrive at the cutting point and tend to force the cutters apart. On the other hand, to prevent excessive friction of the cutters one against the other, the illustrated machine is provided with adjustable means under the control of an adjusting screw 102 for sustaining a variable component of the axial thrust applied to the rotary cutter by the spring. The screw 102 extends through a cover plate 104 and engages an internal screw-thread formed in the later. A thumb-nut 106 is provided to maintain the screw wherever it is set. The lower end of the screw bears on an arm 108 of a bell-crank lever mounted on a pivot-pin 110. The ends of this pin are arranged in bearings formed in the frame 10. The bell-crank lever is also provided with a forked arm 112 which straddles a collar 114 loosely mounted on the cutter-shaft in front of the collar 32. The forked arm 112 carries trunnions 116, each of which is provided with a block 118. The blocks 118 occupy a peripheral groove 120 formed in the collar 114. This device, when properly adjusted by the screw 102, maintains the rear face of the collar 114 against the front face of the collar 32 and thus sustains a variable component of the axial thrust exerted against the shaft 20 by the spring 100 so that the full force of the spring-pressure need not be sustained by the contacting faces of the cutters.

Lubricating oil may be maintained in the chambers 12 and 13 up to the level of the broken line $x$. This level coincides with the rim of an oil cup 122 located outside the frame 10 but connected thereto by a horizontal oil-tube 124. The three shaft bearings 14, 16, and 18 are provided with wicks 126, such as felt, which are partially submerged in oil. The rims of the collar 114 are arranged to run in oil and to carry a sufficient quantity thereof above the oil-level to lubricate all the elements in the chamber 13 even when the oil. Again, the sleeve 85 carries a disk 128 the diameter of which is much greater than that of the eccentric 84, and the rim of which runs in oil. Some of the oil picked up by this disk is thrown by centrifugal force to the top of the chamber 13 for lubricating the rock-shaft 76 and its bearing in the cover plate 78. This disk is arranged adjacent to the eccentric 84 and is preferably provided with non-radial grooves 130 so arranged (see Fig. 8) as to scoop oil and deliver it to the eccentric and to the block 86. The greater diameter of the disk 128 insures lubrication of all the elements in the chamber 13 even when the oil level is low.

Having thus described the invention, what I claim as new and desire to secure by Letters Patent of the United States is:

1. A trimming machine comprising a rotary work-feeding member, mechanism arranged to operate said member, and a member arranged to engage the insole of a lasted shoe and to lift an overdrawn margin of the upper from the insole into engagement with said work-feeding member, the two said members having cooperatively related cutting edges arranged to sever said margin with a shearing cut.

2. A trimming machine comprising a blade arranged to project between two confronting and contiguous elements of a work-piece, one of which elements is a layer of sheet material, said blade having a shearing edge arranged to engage said layer of sheet material, mechanism arranged to reciprocate said blade approximately lengthwise of said edge, a rotary cutter arranged in shearing relation to said edge, and mechanism for operating said rotary cutter.

3. A trimming machine comprising a rotary work-feeding member, mechanism arranged to operate said member, and a segmental arcuate member having an outcurved surface arranged to engage the insole of a lasted shoe while it is moved past said work-feeding member, said members having cooperatively related cutting edges arranged to sever an overdrawn margin of the upper with a shearing cut.

4. A trimming machine comprising a rotary disk cutter having a circular cutting edge, mechanism for driving said cutter, a pointed blade having a shearing edge arranged in shearing relation to said circular cutting edge, and means by which said blade is supported with provision for adjustment lengthwise of its shearing edge.

5. A trimming machine comprising an arcuate blade the inner edge of which is a shearing edge, mechanism arranged to oscillate said blade approximately lengthwise of said edge, a rotary cutter arranged in shearing relation to said inner edge, and mechanism for operating said rotary cutter.

6. A trimming machine comprising a blade formed and arranged to project between two confronting and contiguous elements of a work-piece, one of which elements is a layer of sheet material, mechanism arranged to reciprocate said blade rapidly with short lengthwise strokes, a rotary disk cutter arranged to sever sheet material lying on said blade, and mechanism arranged to operate said cutter.

7. A trimming machine comprising a rotary work-feeding member, mechanism arranged to engage the insole of a lasted shoe ber having a slender wedge-shaped portion arranged to engage the insole of a lasted shoe while moving past said work-feeding member and to lift an overdrawn margin of the upper against said work-feeding member, said members having cooperatively related cutting edges arranged to sever said margin with a shearing cut.

8. A trimming machine comprising a shearing couple one member of which is rotary and driven and has a circular shearing edge, and the other member of which has a thin and narrow shearing portion provided with a point that projects only slightly beyond said circular edge to run between the insole of a lasted shoe and an overdrawn margin of upper material confronting the insole, and means arranged to operate said other member with short, rapid reciprocations to cause it to pick up said overdrawn margin step by step from the insole.

9. A trimming machine comprising a shearing couple one member of which is rotary and driven and has a circular shearing edge, and the other member of which has a slender shearing portion formed and arranged to project between the insole of a lasted shoe and an overdrawn margin of upper material confronting the insole, and means arranged to reciprocate said other member in lines approximately parallel to the contacting surface of the insole.

10. A trimming machine comprising a shearing couple one member of which is rotary and driven and has a circular shearing edge, and the other member of which has a slender shearing portion formed and arranged to project between the insole of a lasted shoe and an overdrawn margin of upper material confronting the insole, and means arranged to reciprocate said other member so that said slender shearing portion will move in lines approximately parallel to the face of the insole.

11. A trimming machine comprising a shearing couple one member of which is rotary and driven and the other member of which is mounted on a pivot member the axis of which is parallel to the rotational axis of said rotary member, said other member having a shearing edge extending nearly lengthwise of its path of movement about the axis of said pivot member, and means arranged to oscillate said other member about the axis of said pivot member.

12. A trimming machine comprising a rotary member having teeth arranged to feed a lasted shoe by engagement with an overdrawn margin of the upper confronting the insole, mechanism arranged to operate said member, and a member arranged to engage the insole of the shoe while the same is fed past said rotary member, said guiding member having a cutting edge against which said margin of the upper is severed by the action of said teeth.

13. A trimming machine comprising a rotary shearing cutter having a circular shearing edge, means for driving said cutter, a pointed shearing blade arranged in shearing relation to said rotary cutter, the point of said blade projecting beyond said circular shearing edge, and means for oscillating said blade lengthwise of its shearing edge about an axis parallel to the axis of said rotary cutter.

14. A trimming machine comprising a rotary driven shaft, a circular shearing cutter carried thereby, a rock-shaft the axis of which is parallel to that of said rotary shaft, a shearing blade carried by said rock-shaft in shearing relation to said circular cutter, and mechanism for oscillating said rock-shaft to operate said blade, the actuating element of said mechanism being carried by said rotary shaft.

15. A trimming machine comprising a rotary driven shaft, an eccentric and a circular shearing cutter both carried by said shaft, a rock-shaft the axis of which is parallel to that of said rotary shaft, a shearing blade carried by said rock-shaft in shearing relation to said circular cutter, and means operated by said eccentric for oscillating said rock-shaft and said blade.

16. A trimming machine comprising two cutter-shafts one of which is axially adjustable, cooperative cutters carried by said shafts respectively and arranged in shearing relation, means arranged to operate said shafts, a spring arranged to urge said one of said shafts axially in a direction to cause pressure of said cutters one against the other, and adjustable means arranged to sustain a variable component of the axial thrust of said one of said shafts and thereby regulate the degree of said pressure of the cutters one against the other.

17. A trimming machine comprising a rotary shearing cutter having a circular shearing edge, means for driving said cutter, a rock-shaft the axis of which is parallel to the axis of said rotary cutter, means for oscillating said rock-shaft, and a cutting blade carried by said rock-shaft, said blade being skewed in relation to a plane at right-angles to said axes but having a flat face and a shearing edge thereon lying in shearing relation to said shearing edge of the circular cutter.

18. A trimming machine comprising a rotary driven shaft and a rock-shaft the axes of which are parallel, mechanism for oscillating said rock-shaft, a blade-holder carried by said rock-shaft, an arcuate blade secured to said blade-holder in skewed relation to a plane at right-angles to said axes, said blade having a flat face at right-angles to said axes and having a shearing edge on the inner side of the arc, and a circular shearing member carried by said rotary shaft in shearing relation to said edge of said blade.

19. A trimming machine comprising a blade arranged to project between two confronting and contiguous elements of a workpiece, one of which elements is a layer of sheet material, said blade having a shearing edge arranged to engage said layer of sheet material, mechanism arranged to reciprocate said blade approximately lengthwise of said edge, a rotary cutter having a circular toothed cutting edge in shearing relation to said edge of said blade, and mechanism for operating said rotary cutter.

20. A trimming machine comprising a rotary driven disk cutter having a cutting edge, an oscillatory blade having a cutting edge in shearing relation to the lower portion of said disk cutter, the axis of oscillation of said blade being above the point of intersection of said edges, and mechanism arranged to oscillate said blade about said axis.

21. A trimming machine comprising a rotary cutter arranged to operate against the outer surface of an overdrawn margin of upper material lying on the insole of a lasted shoe, mechanism arranged to operate said cutter, and a segmental arcuate blade having a wedge-shaped end arranged to pick up said margin from the insole, said wedge-shaped end being so close to the point of cutting as to avoid stabbing the upper at the toe-end of a shoe.

22. A trimming machine comprising two cutting members having cutting edges arranged to cooperate in shearing relation, and mechanism arranged to operate said members one with a rotary motion and the other with a reciprocatory motion lengthwise of its shearing edge.

23. A trimming machine comprising a pointed blade provided with a cutting edge arranged to lift an inwardly extending margin of upper material from the insole of a lasted shoe, a rotary work-feeding member provided with a shearing edge arranged in shearing relation to said cutting edge of said blade, and means for operating said work-feeding member.

24. A trimming machine comprising a rotary member provided with teeth arranged to feed a lasted shoe by engagement with the outer surface of an inwardly extending margin of the upper material, means for operating said member, and means arranged to cooperate with said teeth to trim said margin with a shearing cut.

25. A trimming machine comprising a rotary member provided with teeth arranged to feed a lasted shoe by engagement with the outer surface of an inwardly extending margin of the upper material, means for operating said member, and a blade provided with a shearing edge arranged to lift said margin from the insole and to cooperate with said teeth to trim the margin with a shearing cut.

26. A trimming machine comprising a rotary member provided with sharp-pointed teeth arranged to feed a lasted shoe by engagement with the outer surface of an overdrawn margin of the upper material, means for operating said member, a movable member provided with a shearing edge arranged to run under said margin and to cooperate with said teeth to trim the margin with a shearing cut, and means arranged to operate said movable member with a motion such as to separate the margin from the insole.

In testimony whereof I have signed my name to this specification.

JOHN M. WHELTON.

CERTIFICATE OF CORRECTION.

Patent No. 1,913,421.  June 13, 1933.

JOHN M. WHELTON.

It is hereby certified that error appears in the printed specification of the above numbered patent requiring correction as follows: Page 4, line 17, after "elements" strike out the words "in the chamber 13 even when the oil-" and insert with which the collar has contact.; and lines 94, 95, and 96, claim 7, strike out the syllable and words "ar- arranged to engage the insole of a lasted shoe ber" and insert arranged to operate said member, and a member; and that the said Letters Patent should be read with these corrections therein that the same may conform to the record of the case in the Patent Office.

Signed and sealed this 21st day of November, A. D. 1933.

(Seal)

F. M. Hopkins
Acting Commissioner of Patents.